US008513853B2

(12) United States Patent
Luthardt et al.

(10) Patent No.: US 8,513,853 B2
(45) Date of Patent: Aug. 20, 2013

(54) BRUSH DESIGN FOR SLIP RING CONTACTS

(75) Inventors: Thomas Luthardt, Bamberg (DE); Helmut Repp, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 303 days.

(21) Appl. No.: 12/963,418

(22) Filed: Dec. 8, 2010

(65) Prior Publication Data

US 2011/0140568 A1 Jun. 16, 2011

(30) Foreign Application Priority Data

Dec. 14, 2009 (DE) ......................... 10 2009 058 259

(51) Int. Cl.
*H02K 13/00* (2006.01)
*H02R 39/18* (2006.01)

(52) U.S. Cl.
USPC ........................................... 310/248; 310/228

(58) Field of Classification Search
USPC .................. 310/228, 248, 229, 245, 249–253
See application file for complete search history.

(56) References Cited

U.S. PATENT DOCUMENTS

| | | | | |
|---|---|---|---|---|
| 4,358,699 | A * | 11/1982 | Wilsdorf | 310/251 |
| 5,151,839 | A | 9/1992 | Ota | |
| 7,180,213 | B2 | 2/2007 | Yang | |
| 7,287,985 | B2 * | 10/2007 | Butler | 439/13 |
| 7,519,434 | B2 * | 4/2009 | Darley | 607/137 |
| 7,545,073 | B2 * | 6/2009 | Lewis et al. | 310/248 |
| 7,557,485 | B1 * | 7/2009 | Lynch et al. | 310/248 |
| 7,622,844 | B1 * | 11/2009 | Kuhlmann-Wilsdorf | 310/251 |
| 2008/0111440 | A1 | 5/2008 | Schilling | |

FOREIGN PATENT DOCUMENTS

| | | |
|---|---|---|
| DE | 1233 935 | 2/1967 |
| DE | 26 40 717 | 3/1978 |
| DE | 40 40 513 | 12/1991 |
| DE | 195 43 383 | 5/1997 |
| DE | 198 17 796 | 11/1999 |
| DE | 203 12 458 | 12/2004 |
| DE | 10 2004 030 483 | 10/2005 |
| DE | 10 2007 054 675 | 5/2008 |

OTHER PUBLICATIONS

German Office Action dated Sep. 27, 2010 for corresponding German Patent Application No. DE 10 2009 058 259.2.

* cited by examiner

*Primary Examiner* — Tran Nguyen
*Assistant Examiner* — Leda Pham
(74) *Attorney, Agent, or Firm* — Lempia Summerfield Katz LLC

(57) ABSTRACT

The present embodiments relate to a device for establishing an electrical contact between two device elements moving relative to each other. The device includes a plurality of brushes that may be arranged on one of the device elements and establishes contact on the relative movement of the device elements along a slideway provided on the other device element. The brushes are arranged staggered one behind the other relative to a direction of movement determined by the relative movement. The brush arrangement according to the present embodiments is more robust than conventional arrangements with respect to wear and ageing.

18 Claims, 4 Drawing Sheets

BRUSH DESIGN FOR SLIP RING CONTACTS

This application claims the benefit of DE 10 2009 058 259.2, filed Dec. 14, 2009.

BACKGROUND

The present embodiments relate to a device for establishing an electrical contact between two device elements moving relative to each other.

Arrangements for establishing a sliding contact between two moving components are used in various areas of technology. Arrangements of this kind are used, for example, in computer tomographs, which have a stationary structure and elements rotating around the patient (e.g., radiation sources and detectors). The transmission of data or energy between the moving part (e.g., a rotor) and the stationary part (e.g., a stator) is achieved, for example, by sliding contacts (e.g., a slip ring).

Arrangements of this kind may have a lubricant (e.g., a liquid lubricant) between components moved relative to each other. The operation of a sliding contact arrangement also develops abrasion. Abrasion may include small particles that are ground off during operation.

Lubricants and abrasion may have a negative impact on the contact element used. For example, the operational capability of brushes in conventional brush-type contact pickoffs becomes impaired over time. The lubricant or the mixture of abrasion and lubricant impairs the elasticity of the brushes over time. As a result, the entire system reacts much more sensitively to unevennesses in the slideway, and the signal quality deteriorates. For this reason, the brushes used for the currents and voltages may be overdimensioned. The overdimensioning (e.g., increasing the wire diameter of wires from which the brushes are formed) has certain drawbacks such as, for example, a deterioration of the dynamic properties due to the greater weight of the brush.

Comparable problems are addressed in DE 195 43 383 B4, DE 198 17 796 C2 and DE 102 007 054 675 A1. These publications describe possibilities for avoiding the negative consequences of abrasion (e.g., with the aid of a collecting device (DE 195 43 383 B4 and DE 102 007 054 675 A1) or by design measures (DE 198 17 796 C2)).

SUMMARY AND DESCRIPTION

The present embodiments may obviate one or more of the drawbacks or limitations in the related art. For example, in one embodiment, a brush design for a brush contact system with better durability than conventional brush contact systems may be provided. In another embodiment, a brush contact system that withstands the negative influences of lubricants and abrasion for longer and thus has a longer service life may be provided.

The present embodiments are based on a device for establishing an electrical contact between two device elements moving relative to each other (e.g., a rotor and a stator). The contact is established by a plurality of brushes arranged on one of the device elements or held by the one device element. The plurality of brushes establishes contact on the relative movement of the device elements along a slideway provided on the other device element (i.e., the plurality of brushes slide along the other device element and thereby establish a contact). The plurality of brushes may be arranged staggered one behind the other relative to a direction of movement determined by the relative movement. In one embodiment, the offset is up to 50% of the brush diameter (e.g., 20%-30% of the brush diameter). This arrangement may be effected, such that during the course of the movement executed by the plurality of brushes, a substance (e.g., lubricant, abrasion) provided between the device elements may be pushed or guided out of the way. For example, the plurality of brushes may be arranged in an arrow shape relative to the direction of movement, such that the substance is pushed or guided out of the way. According to another embodiment, the plurality of brushes is arranged in the form of an inclined line relative to the direction of movement.

The arrangement of the plurality of brushes according to the present embodiments pushes dirt or oil mixtures to the side so that the individual brushes have less contact with the dirt or oil mixtures. This, therefore, reduces the impairment of the brushes, and the brushes remain elastic for longer and have a longer service life. In addition, an arrangement with a plurality of small brushes has greater elasticity than one big brush with a corresponding number of contact wires. This enables unevennesses and faulty points on the track to be better compensated. The plurality of brushes according to the present embodiments may have a much smaller diameter than the brushes of the prior art. For example, each brush of the plurality may include 25-100 fibers.

In one embodiment, the plurality of brushes is arranged on a carrier (e.g., brush holder or spring holder). The carrier may be, for example, a parallel rocker arm so that the angle of the plurality of brushes relative to the contacted element (e.g., the other element) remains substantially constant.

In another embodiment, solid lubricant is used for the brushes and/or for the slideway. The solid lubricant may, for example, be incorporated in each brush of the plurality as individual fibers, which wear uniformly with the plurality of brushes. This, at least partially, eliminates problems incurred by oil lubrication.

DETAILED DESCRIPTION OF THE DRAWINGS

Figure 1:
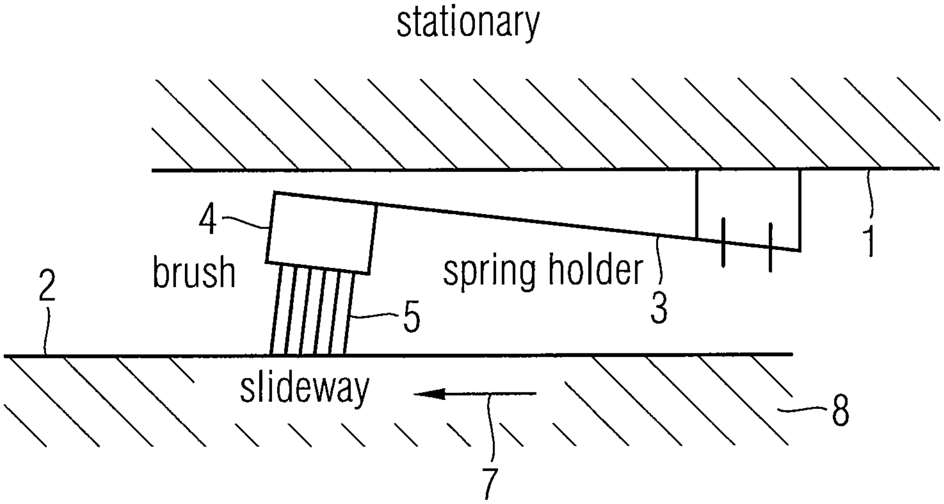
FIG. 1 shows a brush contact system.

FIG. 1 shows a brush contact system arrangement. A spring holder 3 is arranged on a first component 1. The spring holder 3 includes a carrier 4 for a brush 5. The brush 5 establishes contact with a slideway 2 of a second component 8 moved relative to the first component 1. The brush 5 may be formed with approximately 600-1900 fibers, for example. A direction of movement is identified with reference number 7. In a computer tomograph, the first component 1 supporting the brush 5 is stationary, while the second component 8 rotates.

Figure 2:
FIG. 2 shows a view of a spring holder of the brush contact system shown in FIG. 1.

FIG. 2 is a view of the spring holder 3 of the brush contact system arrangement shown in FIG. 1. FIG. 2 illustrates two locations 6 where the spring holder 3 is secured to the first component 1.

Figure 3:
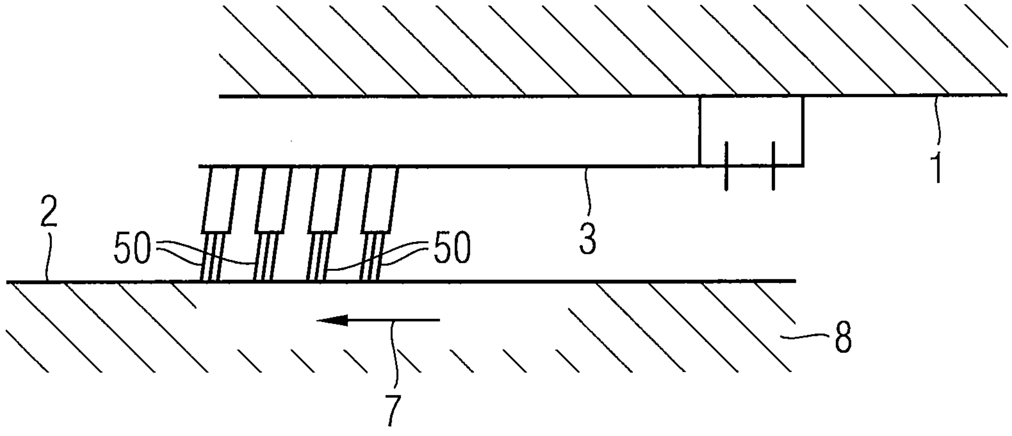
FIG. 3 shows one embodiment of a brush contact system.

FIG. 3 shows one embodiment of a brush contact system. Instead of a single brush 5, a plurality of small brushes, bunches or bundles, 50 are provided. A bundle 50 may include significantly fewer fibers than brushes known from the prior art. Approximately fifty fibers may represent an effective design. A plurality of small and thin bundles or bunches 50 are mounted one behind the other and offset on the spring holder 3. With this arrangement, dirt and oil mixtures are pushed to the side so that bunches or brushes 50 arranged therebehind collect little oil. The redundancy is further increased, since the elasticity of each of the bunches 50 is much higher than with conventional arrangements. The plurality of bundles or bunches 50 may compensate significantly more for unevenness or faulty points on the track. As FIG. 4 shows, the plurality of brushes 50 may be in an arrow-shaped arrangement, with which the contamination is pushed to the side.

This brush contact arrangement in the form of thin elastic contact bundles increases tolerance toward slideway uvenesses. The slideway 2 may not be machined. The influence of oil or dirt and mixtures on the track decreases. The signal quality remains constant despite lower voltages and currents.

Figure 4:
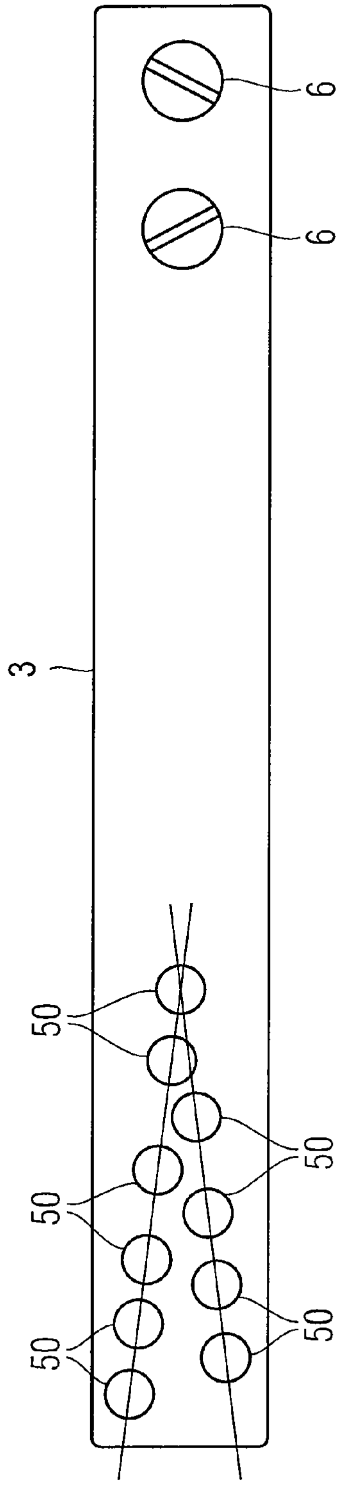
FIG. 4 shows a view of one embodiment of a spring holder of the brush contact system shown in FIG. 3.
Figure 5:
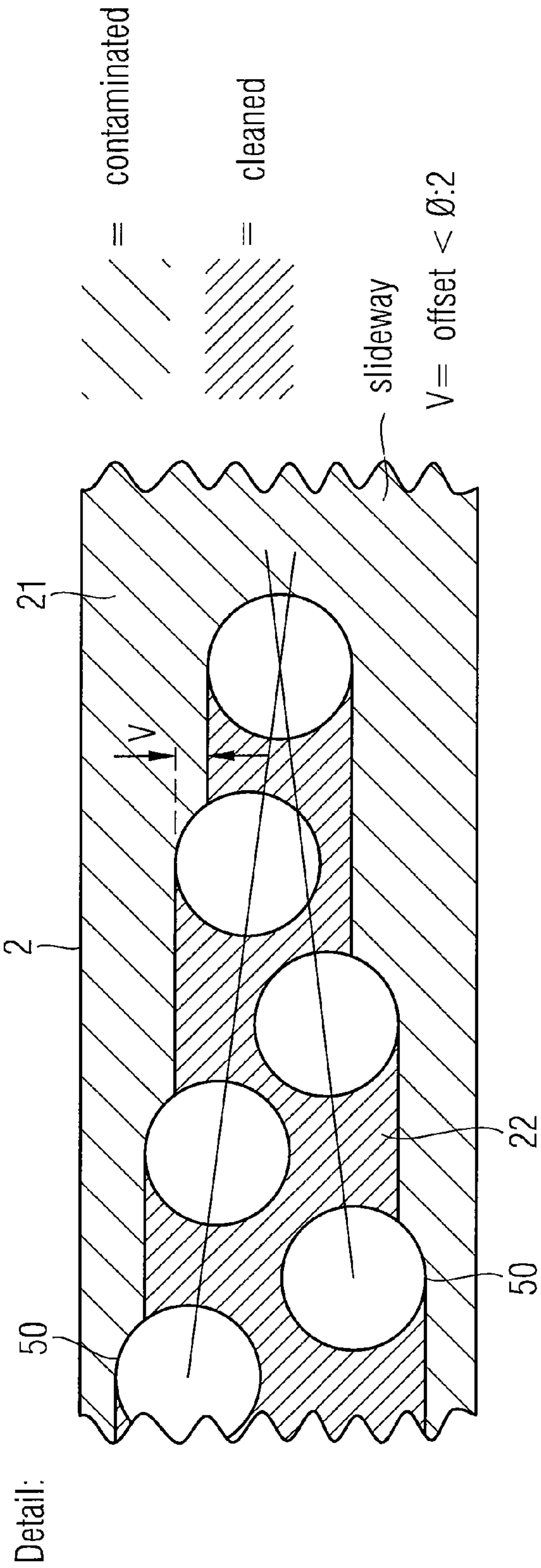
FIG. 5 shows a detail of the arrangement of a plurality of brushes shown in FIG. 4.

FIG. 5 shows a detail of the arrangement of the plurality of brushes 50 shown in FIG. 4. Two different regions 21 and 22 are identified on the slideway 2 by different hatch patterns. Oil, abrasion or dirt may penetrate the region 21 unimpeded. The second region 22 is screened by the arrangement of the plurality of brushes 50 so that the penetration of oil, abrasion or dirt is impeded or even prevented. As a result, the plurality of brushes 50 has less contact with substances that influence the fitness of the plurality of brushes 50 for purpose over time. With the arrangement shown in FIGS. 4 and 5, the plurality of bunches 50 are arranged staggered behind one another relative to the direction of movement. In one embodiment, an offset V is up to 50% of the diameter of each bunch 50 of the plurality. In another embodiment, the offset V is approximately 25% of the diameter of each bunch 50 of the plurality (e.g., between 20% and 30%).

Figure 6:
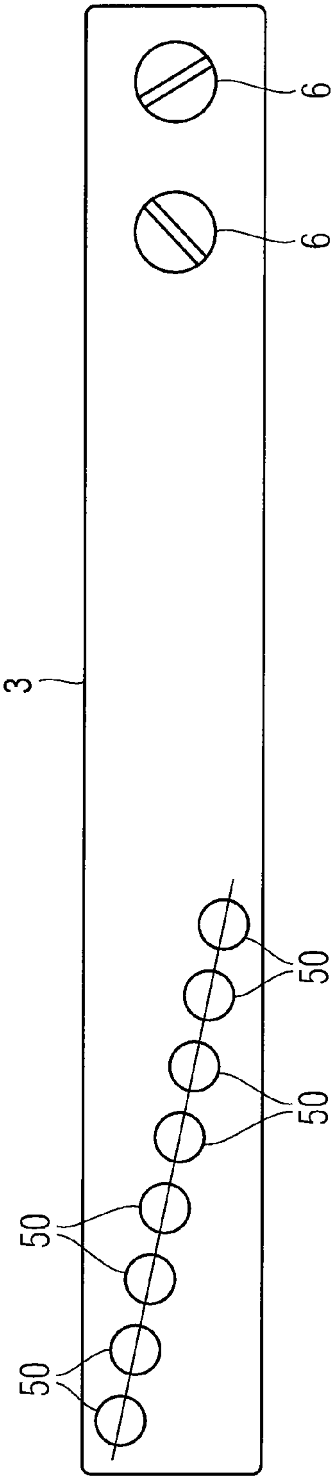
FIG. 6 shows one embodiment of a brush contact system.

FIG. 6 shows an alternative embodiment to that shown in FIGS. 4 and 5. FIG. 6 shows the plurality of bunches 50 arranged staggered one behind the other in a line.

Figure 7:
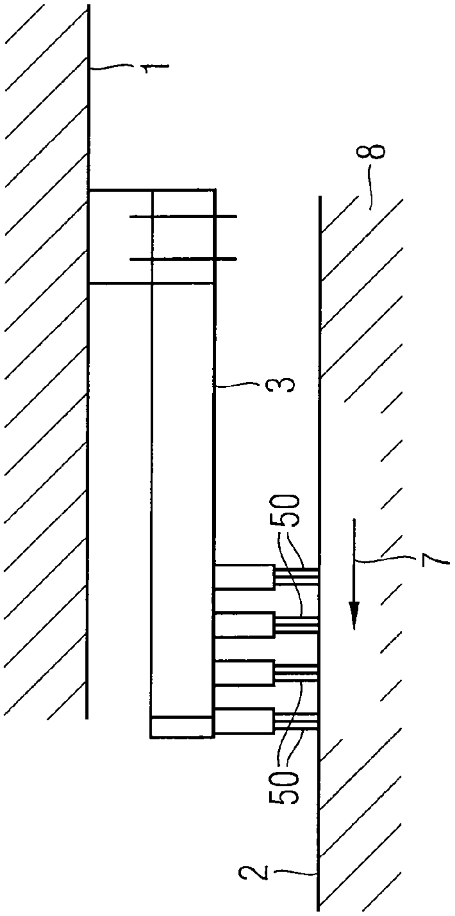
FIG. 7 shows one embodiment of a brush contact system having a parallel rocker arm.

FIG. 7 shows a brush contact system that is configured as a parallel rocker arm that keeps the angle between the plurality of brushes 50 and the slideway 2 or the second component 8 constant. The parallel rocker arm is, for example, a parallel spring joint. The spring holder 3 is, for example, configured with two parallel plate springs with an at least partially solid connection thus providing a constant angle between the plurality of bunches 50 and the slideway 2. The contact angle of the plurality of brushes 50 does not change due to wear; the angles at the plurality of brushes 50 remain constant on compression and extension of the springs. This prolongs the service life of the contact device, since, with present contact systems, the angle changes on increasing wear. The brushes are replaced, since otherwise, the angle becomes negative, and the brushes may display stip-slick effects.

The present embodiments may be used, for example, for computer tomographs. However, the present embodiments are not restricted to this field of application but may be used for any technical application establishing a contact between two parts or components moving relative to other (e.g., automation).

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A device for establishing an electrical contact between two device elements moving relative to each other, the device comprising:

a slideway disposed on one of the two device elements; and a plurality of brushes arranged on the other of the two device elements, the plurality of brushes establishing contact on the relative movement of the device elements along the slideway, wherein the plurality of brushes is arranged staggered by an offset, one brush behind the other relative to a direction of movement determined by the relative movement, and wherein the plurality of brushes is arranged in the form of an inclined line relative to the direction of movement.

2. The device as claimed in claim 1, wherein the offset is 50% of the brush diameter or less.

3. The device as claimed in claim 2, wherein the offset is 20%-30% of the brush diameter.

4. The device as claimed in claim 1, wherein each brush of the plurality comprises 25-100 fibers.

5. The device as claimed in claim 1, wherein the plurality of brushes is arranged relative to the direction of movement, such that the plurality of brushes pushes a substance located between the device elements away.

6. The device as claimed in claim 1, wherein the plurality of brushes is arranged in an arrow shape relative to the direction of movement.

7. The device as claimed in claim 1, further comprising a carrier, the plurality of brushes being arranged on the carrier.

8. The device as claimed in claim 7, wherein the carrier is arranged, using a parallel rocker arm on the other device element, such that an angle between the plurality of brushes and the one device element is constant.

9. The device as claimed in claim 1, wherein the plurality of brushes is made of solid lubricant.

10. The device as claimed claim 1, wherein the slideway is made of solid lubricant.

11. The device as claimed in claim 2, wherein each brush of the plurality comprises 25-100 fibers.

12. The device as claimed in claim 3, wherein each brush of the plurality comprises 25-100 fibers.

13. The device as claimed in claim 2, wherein the plurality of brushes is arranged in an arrow shape relative to the direction of movement.

14. The device as claimed in claim 4, wherein the plurality of brushes is arranged in an arrow shape relative to the direction of movement.

15. The device as claimed in claim 6, further comprising a carrier, the plurality of brushes being arranged on the carrier.

16. The device as claimed in claim 3, further comprising a carrier, the plurality of brushes being arranged on the carrier.

17. The device as claimed in claim 4, wherein the plurality of brushes is made of solid lubricant.

18. A device for establishing an electrical contact between two device elements moving relative to each other, the device comprising:

a slideway disposed on one of the two device elements; and a plurality of brushes arranged on the other of the two device elements, the plurality of brushes establishing contact on the relative movement of the device elements along the slideway, wherein the plurality of brushes is arranged staggered by an offset, one brush behind the other relative to a direction of movement determined by the relative movement, and wherein the plurality of brushes is arranged in an arrow shape relative to the direction of movement.

* * * * *